United States Patent
Porat et al.

(10) Patent No.: US 8,019,139 B2
(45) Date of Patent: Sep. 13, 2011

(54) METHOD AND SYSTEM FOR PROCESSING AN IMAGE OF BODY TISSUES

(75) Inventors: Hadar Porat, Tel-Aviv (IL); Ido I. Milstein, Tel-Aviv (IL); Shmuel Akerman, Binyamina (IL); Gad G. Miller, Israel (IL)

(73) Assignee: Carestream Health, Inc., Rochester, NY (US)

( * ) Notice: Subject to any disclaimer, the term of this patent is extended or adjusted under 35 U.S.C. 154(b) by 1017 days.

(21) Appl. No.: 11/248,553

(22) Filed: Oct. 12, 2005

(65) Prior Publication Data

US 2007/0081702 A1    Apr. 12, 2007

(51) Int. Cl.
G06K 9/00 (2006.01)
G06K 9/40 (2006.01)

(52) U.S. Cl. .................................. 382/131; 382/199

(58) Field of Classification Search .......... 382/128–132, 382/199, 260, 266, 243, 209, 215, 217, 224–225, 382/286, 291, 294–295, 203; 345/435, 441, 345/442

See application file for complete search history.

(56) References Cited

U.S. PATENT DOCUMENTS

| | | | |
|---|---|---|---|
| 6,078,680 A * | 6/2000 | Yoshida et al. | 382/128 |
| 6,496,188 B1 * | 12/2002 | Deschamps et al. | 345/419 |
| 6,865,286 B2 * | 3/2005 | Florent et al. | 382/128 |
| 6,968,078 B2 * | 11/2005 | Florent et al. | 382/128 |
| 7,016,521 B1 * | 3/2006 | Florent | 382/128 |
| 7,079,674 B2 * | 7/2006 | Paragios et al. | 382/128 |
| 7,349,573 B2 * | 3/2008 | Porikli | 382/164 |
| 7,519,209 B2 * | 4/2009 | Dawant et al. | 382/128 |
| 2003/0053697 A1 * | 3/2003 | Aylward et al. | 382/203 |

FOREIGN PATENT DOCUMENTS

WO    WO 2004/012584    2/2004

OTHER PUBLICATIONS

Yang et al, Edge based Segmentation and Active Contours, <http://www.doc.ic.ac.uld~gzy>.*
Cohen et al, Grouping connected components using minimal path techniques, T. Deschamps, L.D. Cohen. Geometric Methods in Bio-Medical Image Processing, Ed. Ravikanth Malladi, Mathematics and Visualization Series, Springer, Dec. 2001.*

(Continued)

*Primary Examiner* — Gregory M Desire
*Assistant Examiner* — Andrae S Allison

(57) ABSTRACT

A method and system for detecting a boundary between a first tissue and a second tissue in a two-dimensional image. A cost is assigned to each pixel in a detection region indicative of the likelihood that the pixel is not located on the boundary between the first tissue and the second tissue. The boundary between the first and second tissues or organs is a path of voxels of minimal cost in the detection region from among two or more paths, the cost of a path being obtained in a calculation based upon the costs assigned to the voxels of the path. The method may be used to detect a boundary between a first tissue or organ and a second tissue or organ in a three-dimensional scan by applying the method to each of one or more two-dimensional sections and joining the two dimensional boundaries into a three dimensional boundary in the three dimensional scan. The method may also be used in segmenting a three-dimensional body scan.

27 Claims, 3 Drawing Sheets

OTHER PUBLICATIONS

JiaYong Yan, TianGe Zhuang, Applying improved fast marching method to endocardial boundary detection in echocardiographic images, Pattern Recognition Letters, vol. 24, Issue 15, Nov. 2003, pp. 2777-2784.*

Chao Han et al., A Fast Minimal Path Active Contour Model, IEEE Transactions on Image Processing, vol. 10, No. 6, pp. 865-873, Jun. 2001, XP11025791A.

Laurent D. Cohen, Multiple Contour Finding and Perceptual Grouping Using Minimal Paths, Journal of Mathematical Imaging and Vision 14: pp. 225-236, XP008007360.

Jia Yong Yan et al., Applying Improved Fast Marching Method to Endocardial Boundary Detection in Echocardiographic Images, Pattern Recognition Letters 24 (2003), pp. 2777-2784, XP4443643A.

Hua Li et al., 3D Medical Image Segmentation Approach Based on Multi-Label Front Propagation, 2004 International Conference on Image Processing (ICIP), pp. 2925-2928, XP10786409A.

Laurent D. Cohen, Minimal Paths and Deformable Models for Image Analysis, Traitement du Signal 2003, vol. 20, No. 3—Special 2003, pp. 225-241, XP008081860.

Principal Axes: Young-Hoo Kwon, Motion Analysis (1988), available at http://kwon3d.com/theory/moi/prin.html.

Image processing: Dougherty, E.R. & Latufo R.A., Hands-On Morphological Image Processing, Tutorial texts in optical engineering, vol. 59, SPIE Press, Washington, 2003, pp. 25-28.

Calculus of Variations: Eric W. Weisstein, "Calculus of Variations" from MathWorld—A Wolfram Web Resource, http://mathworld.wolfram.com/CalculusofVariations.html, Jun. 9, 2005.

The Fast Marching Algorithm: Sethian, J.A., Level Set and Fast Marching Methods (1996), Cambridge University Press (1996), pp. 86-99.

Laurent D. Cohen, R. Kimmel, Globe Minimum for Active Contour Models: A Minimal Path Approach, in International Journal of Computer Vision 24(1)(1997), 57-78.

Abena B. Redwood, Jon J. Camp, Richard A, Robb, Semiautomatic segmentation of the heart from CT images based on intensity and morphological features, Mayo Clinic and Foundation, 200 First Street SW, Rochester, MN, USA 55905, 2005.

D. Metaxas, T. Chen, X. Huang and L. Axel, Cardiac Segmentation from MRI-Tagged and CT Images, Division of Computer and Information Sciences and Dept. of Radiology, Rutgers University, Piscataway, NJ and New York University, New York, 2004.

* cited by examiner

METHOD AND SYSTEM FOR PROCESSING AN IMAGE OF BODY TISSUES

FIELD OF THE INVENTION

The present invention relates to methods for analyzing images of body tissues, such as an image obtained by radiographic techniques including computer tomography (CT).

BACKGROUND OF THE INVENTION

A computer tomography (CT) scan is three-dimensional (3D) image of at least a portion of a subject's body. The scan is a 3D array of integers each of which is the gray level of a body volume element called a voxel. Each voxel in the scan is addressed by means of a triplet of integral coordinates (x,y,z). A voxel in a 2D array or in an image is referred to as a "pixel". The distance between adjacent voxels along the coordinate axes are referred to as "the x-mm-per-pixel", the "y-mm-per-pixel" and the "z-mm-per-pixel". The x- y- and z-mm-per-pixel are usually constant for a specific scan. The x- and y-mm-per-pixel are usually equal in which case they are both referred to simply as the "mm-per-pixel". The x- and y-dimensions of a scan are a property of the scanner and are usually equal, having a value of 512 pixels for most scanners. The z axis is conventionally taken to be parallel to the longitudinal axis of the subject's body, the y axis directed upwards, and the x axis perpendicular to the y and z axes. A two dimensional (2D) section of the 3D image parallel to one of the coordinate axes is referred to as a "section" of the image. With this convention, in a scan of a supine subject, a (2D) slice of the scan that is parallel to the x, y and z axis is a 2D image of a saggital, coronal and axial section, respectively, of the subject's body. An axial section is also referred to as a "slice" of the scan.

The scan data usually also include the intercept and slope of the scanner. These two numbers are used to convert the gray level values of a specific scan to standard units of gray levels (given in Hounsfields):

Values in Hounsfields=slope*scanner output values−intercept.

All gray level values are given hereinafter in Hounsfields (i.e. after conversion to standard units).

A CT scan of a particular organ or tissue of interest will typically include portions of tissues that are adjacent to the organ or tissue of interest. For example, a CT scan of the heart will include organs and tissues adjacent to the heart. The term "cage" is used to refer to non-heart tissues included in a cardiac CT scan and usually includes portions of the lungs, ribs, sternum and liver. In order to analyze a CT scan, it is desirable to remove from the collected data those tissues and organs that are not part of the organ or tissue of interest. This entails locating boundaries between the organ or tissue of interest and surrounding tissues. Once the boundaries of the tissue or organ of interest have been determined, organs and tissues surrounding the tissue or organ of interest can be removed from the scan, a process known as "segmentation" of the data. Segmenting a given CT scan involves determining, for each of one or more voxels in the scan, whether or not the voxel belongs to the tissue or organ of interest. An attribute of 0 or 1 is assigned to each voxel in the scan that specifies whether the voxel belongs to the tissue of interest, or not, respectively. This data is held in a data structure that consists of a three-dimensional array of 0's and 1's, of the same integer dimensions as the scan.

Automatic detection of a boundary between adjacent organs or tissues in a scan is complicated by several factors. For example, removing the cage from a cardiac CT scan is complicated, first of all, by the fact that the range of gray values of cardiac muscle differs from one scan to another, mainly due to variability among subjects. Thus, automatic separation of the heart tissue from surrounding tissues based upon gray levels requires that the range of gray levels of the heart muscle in a given scan be determined. Furthermore, separation of the liver from the heart muscle is difficult because these two tissues have very similar ranges of gray values. The segmentation needs to be precise while avoiding cutting off heart parts, especially any part of the coronary arteries, the analysis of which is one of the main purposes of a heart scan. This is especially difficult when removing the liver.

SUMMARY OF THE INVENTION

In its first aspect, the present invention provides a system and method for detecting a boundary between two body tissues or organs in a 2D image. A cost is assigned to voxels in a detection region of the image containing the boundary to be detected. The cost is indicative of the likelihood that the voxel is not found on the boundary between the two tissues. One or more potential initial points of the boundary in the region are provided, as well as one or more end points of the boundary. A path of voxels joining an initial point to an end point has a cost which is obtained in a calculation involving the costs of the voxels in the path. The cost of a path is preferably the sum of the costs of the voxels in the path. A path having minimal cost from among two or more paths joining an initial point and an end point is taken as the boundary between the first and second organs in the image.

In a preferred embodiment, a path of minimal cost is obtained in an iterative process in which, at each stage, a voxel of minimum cost neighboring the previously added voxel is added to the growing path. In a most preferred embodiment of the invention, a path of minimal cost is found using a so called "fast marching algorithm". Given a graph, and a cost for entering each node from each of its neighbors, a Fast Marching algorithm is a method for advancing fronts of equal cost in the graph. Some nodes of the graph are assigned as initial points and are given the cost of 0. These nodes are inserted into a heap. In each step, a minimal cost node is pulled out of the heap, the costs for its neighbors are calculated (these costs are positive and are possibly infinite) and the finite cost neighbors are inserted to the heap. The algorithm stops when the heap is empty. This happens when a connected component of non infinite-cost nodes is covered. In a preferred embodiment, in order to assign a cost to a voxel in the detection region, the gray level of the voxel is used to classify the voxel as belong to one or more tissue types. In general, each tissue type has a characteristic range of gray levels in an image. Thus for example, a lung-voxel has a gray value below −500 Hounsfields, a fat voxel has a gray value in the range of about −100 to 0 Hounsfields; a heart or liver voxel has a gray value—around 0-100 Hounsfields which is above the fat range but less than the minimal contrast material value (typically around 100 Hounsfields); and a contrast-material voxel has a gray value greater than 100 Hounsfields. (There may be a dead range of gray values, for example, between the lung maximum value and the minimal fat value, but voxels in this range are rarely encountered and may be neglected when encountered.) The gray level ranges for some of the tissue types are learnt from the data. For example, the average fat value and its standard deviation may be calculated from a region in the scan that is known to be fat tissue, and take the fat range to be the mean±one in the standard deviation.

Given a voxel in the detection region, neighbors of the voxel in a direction perpendicular to the general direction of the boundary to be detected are found. For example, if the boundary to be detected is generally perpendicular to the z axis of the image, 5 neighbors of the given voxel along the z axis on either side of the given voxel might be found. The tissue type classification of the given voxel and each of its neighbors just found based upon its gray level is determined, as just described. The number of "missing" neighbors is also counted which occurs when the given voxel is close to the edge of the image. A cost is then assigned to the given voxel based upon the classifications of its neighbors. The cost is indicative of the likelihood that a point on the boundary to be detected does not have the arrangement of neighbors of the given voxel.

In one embodiment of the invention, a "good-grade" and a "bad-grade" are first assigned to the given voxel, and the cost is defined as the difference "bad-grade"–"good-grade". A constant offset may be added to the difference in order to ensure that the cost is positive, which is necessary, for example, when a fast marching technique is to be used. The good-grade is indicative of the extent that the given voxel's arrangement of neighbors has attributes expected of a voxel at the boundary to be detected. For example, if on a first side of the boundary to be detected, voxels of one or more particular classifications are expected, then the good-grade will be higher the more neighbors of those classifications that the given voxel has on that side. Similarly, if on the other side of the boundary to be detected, voxels of one or more particular classifications are expected, then the good-grade will be higher the more neighbors of those classifications that the given voxel has on that side. The bad-grade is indicative of the extent that the given voxel's arrangement of neighbors has attributes different from the attributes expected of a voxel at the boundary to be detected. For example, if on a first side of the boundary to be detected, voxels of one or more particular classifications are not expected, then the bad-grade will be higher the more neighbors of those classifications that the given voxel has on that side. Similarly, if on the other side of the boundary to be detected voxels of one or more particular classifications are not expected, then the bad-grade will be higher the more neighbors of those classifications that the given voxel has on that side.

In its second aspect, the invention provides a method for detecting a boundary between two body tissues or organs in a 3D image, such as a CT scan. In accordance with this aspect of the invention, a boundary between the body tissues or organs is detected in each of a plurality of two-dimensional slices of the image, where, for at least one of the slices, the boundary is found by the method of the first aspect of the invention. A boundary detected in one slice may be used to define the detection region for a neighboring slice in the plurality of slices, in order to decrease the size of the detection region and improve computability. The set of boundaries detected in the slices is interpolated in the 3D image to determine a surface in the 3D image that is the boundary between the two tissues.

In its third aspect, the invention provides a method for segmenting a 3D image in order to remove from the image organs and tissues other than an organ or tissue of interest. In accordance with this aspect of the invention, one or more boundaries is found in the 3D image between a tissue or organ of interest and other tissues or organs in the image by the method of the second aspect of the invention. The boundaries are used to determine which voxels in the image belong to the tissue or organ of interest and which voxels do not belong to the tissue or organ of interest. Voxels belonging to the tissue or organ of interest are assigned an attribute of 0, while voxels not belonging to the tissue or organ of interest are assigned an attribute of 1. This data is held in a bit-volume of the same integer dimensions as the image.

Thus, in its first aspect, the invention provides a method for detecting a boundary between a first tissue and a second tissue in at least a detection region of a two-dimensional image, comprising:
  (a) assigning a cost to each voxel in the detection region, the cost being indicative of the likelihood that the voxel is not located on the boundary between the first tissue and the second tissue;
  (b) designating in the detection region at least one initial point of the boundary and at least one end point of the boundary;
  (c) obtaining a path of voxels in the detection region joining an initial point and an end point of minimal cost from among two or more paths joining an initial point and an end point, the cost of a path being obtained in a calculation based upon the costs assigned to the voxels of the path; and
  (d) designating the path having minimal cost as the boundary between the first and second tissues.

In its second aspect, the invention provides a method for detecting a boundary between a first tissue or organ and a second tissue or organ in a three-dimensional scan, comprising:
  (e) For each of one or more two-dimensional sections of the scan:
    i) assigning a cost to each voxel in a detection region, the cost being indicative of the likelihood that the voxel is not located on the boundary between the first tissue and the second tissue;
    ii) designating in the detection region at least one initial point of the boundary and at least one end point of the boundary;
    iii) obtaining a path of voxels in the detection region joining an initial point and an end point of minimal cost from among two or more paths joint an initial point and an end point, the cost of a path being obtained in a calculation based upon the costs assigned to the voxels of the path; and
    iv) designating the path having minimal cost as a boundary between the first and second tissues in the two-dimensional section;
  the boundary between the first and second organ or tissue in the three-dimensional scan being formed by the boundaries designated in the two dimensional sections.

In its third aspect, the invention provides a method for segmenting a three-dimensional scan having a tissue or organ of interest and one or more cage tissues or organs, comprising:
  (a) For each of the one or more cage tissues or organs:
    i) For each of one or more two-dimensional sections of the scan:
      (a) Assigning a cost to each voxel in a detection region, the cost being indicative of the likelihood that the voxel is not located on the boundary between the tissue or organ of interest and the cage tissue or organ;
      (b) Designating in the detection region at least one initial point of the boundary and at least one end point of the boundary;
      (c) Obtaining a path of voxels in the detection region joining an initial point and an end point of minimal cost from among two or more paths joining an initial point and an end point, the cost of a path being obtained in a calculation based upon the costs assigned to the voxels of the path; and (d) Designating the path having minimal cost as a boundary between the tissue or organ of interest and the cage tissue or organ of interest in the two-dimensional section; and ii) Designating a boundary between the tissue or organ of interest and the cage tissue or organ in the scan formed by the boundaries designated in the two-dimensional sections;

(b) generating a bit-volume having integer dimensions equal to integer dimensional of the scan, a voxel in the bit-volume having a value of 0 if the voxel belongs to the tissue of interest as determined by the boundaries between the tissue or organ of interest and the one or more cage tissues or organs, and a voxel in the bit-volume having a value of 1 if the voxel belongs to the one or more cage tissues or organs, as determined by the boundaries between the tissue or organ of interest and the one or more cage tissues or organs.

In its fourth aspect, the invention provides a program storage device readable by machine, tangibly embodying a program of instructions executable by the machine to perform method steps for detecting a boundary between a first tissue and a second tissue in at least a detection region of a two-dimensional image, comprising:

(a) obtaining a path of voxels in the detection region joining an initial point and an end point of minimal cost from among two or more paths joining an initial point and an end point, the cost of a path being obtained in a calculation based upon costs assigned to the voxels of the path; and (b) designating the path having minimal cost as the boundary between the first and second tissues.

In its fifth aspect, the invention provides a computer program product comprising a computer useable medium having computer readable program code embodied therein for detecting a boundary between a first tissue and a second tissue in at least a detection region of a two-dimensional image, the computer program product comprising computer readable program code for causing the computer to obtain a path of voxels in the detection region joining an initial point and an end point of minimal cost from among two or more paths joining an initial point and an end point, the cost of a path being obtained in a calculation based upon costs assigned to the voxels of the path.

In its sixth aspect, the invention provides a program storage device readable by machine, tangibly embodying a program of instructions executable by the machine to perform method steps for detecting a boundary between a first tissue or organ and a second tissue or organ in a three-dimensional scan, comprising:

(a) For each of one or more two-dimensional sections of the scan:

ii) obtaining a path of voxels in the detection region joining an initial point and an end point of minimal cost from among two or more paths joining an initial point and an end point, the cost of a path being obtained in a calculation based upon costs assigned to the voxels of the path; and iii) forming the boundary between the first and second organs or tissue in the three-dimensional scan being from the boundaries designated in the two dimensional sections.

In its seventh aspect, the invention provides a computer program product comprising a computer useable medium having computer readable program code embodied therein for detecting a boundary between a first tissue or organ and a second tissue or organ in a three-dimensional scan, the computer program product comprising:

computer readable program code for causing the computer to obtain a path of voxels in a detection region joining an initial point and an end point of minimal cost from among two or more paths joint an initial point and an end point, the cost of a path being obtained in a calculation based upon costs assigned to the voxels of the path; and computer readable program code for causing the computer to designate the path having minimal cost as a boundary between the first and second tissues in the two-dimensional section;

computer readable program code for causing the computer to form the boundary between the first and second organ or tissue in the three-dimensional scan from the boundaries designated in the two dimensional sections.

In its eighth aspect, the invention provides a program storage device readable by machine, tangibly embodying a program of instructions executable by the machine to perform method steps for segmenting a three-dimensional scan having a tissue or organ of interest and one or more cage tissues or organs, comprising:

(a) For each of the one or more cage tissues or organs:

i) For each of one or more two-dimensional sections of the scan:

(a) Obtaining a path of voxels in a detection region joining an initial point and an end point of minimal cost from among two or more paths joining an initial point and an end point, the cost of a path being obtained in a calculation based upon costs assigned to the voxels of the path; and (b) Designating the path having minimal cost as a boundary between the tissue or organ of interest and the cage tissue or organ of interest in the two-dimensional section; and ii) Designating a boundary in the three-dimensional scan between the tissue or organ of interest and the cage tissue or organ formed by the boundaries designated in the two-dimensional sections;

(b) generating a bit-volume having integer dimensions equal to integer dimensional of the scan, a voxel in the bit-volume having a value of 0 if the voxel belongs to the tissue of interest as determined by the boundaries between the tissue or organ of interest and the one or more cage tissues or organs, and a voxel in the bit-volume having a value of 1 if the voxel belongs to the one or more cage tissues or organs, as determined by the boundaries between the tissue or organ of interest and the one or more cage tissues or organs.

In its ninth aspect, the invention provides a computer program product comprising a computer useable medium having computer readable program code embodied therein for segmenting a three-dimensional scan having a tissue or organ of interest and one or more cage tissues or organs, the computer program product comprising:

computer readable program code for causing the computer, for each of the one or more cage tissues or organs, for each of one or more two-dimensional sections of the scan, to determine a path of voxels in a detection region in the section joining an initial point and an end point of minimal cost from among two or more paths joining an initial point and an end point, the cost of a path being obtained in a calculation based upon costs assigned to the voxels of the path;

computer readable program code for causing the computer to Designate the path having minimal cost as a boundary between the tissue or organ of interest and the cage tissue or organ of interest in the two-dimensional section; and computer readable program code for causing the computer to Designate a boundary between the tissue or organ of interest and the cage tissue or organ in the scan formed by the boundaries designated in the two-dimensional sections;

computer readable program code for causing the computer to generate a bit-volume having integer dimensions equal to integer dimensional of the scan, a voxel in the bit-volume having a value of 0 if the voxel belongs to the tissue of interest as determined by the boundaries between the tissue or organ of interest and the one or more cage tissues or organs, and a voxel in the bit-volume having a value of 1 if the voxel belongs to the one or more cage tissues or organs, as determined by the boundaries between the tissue or organ of interest and the one or more cage tissues or organs.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
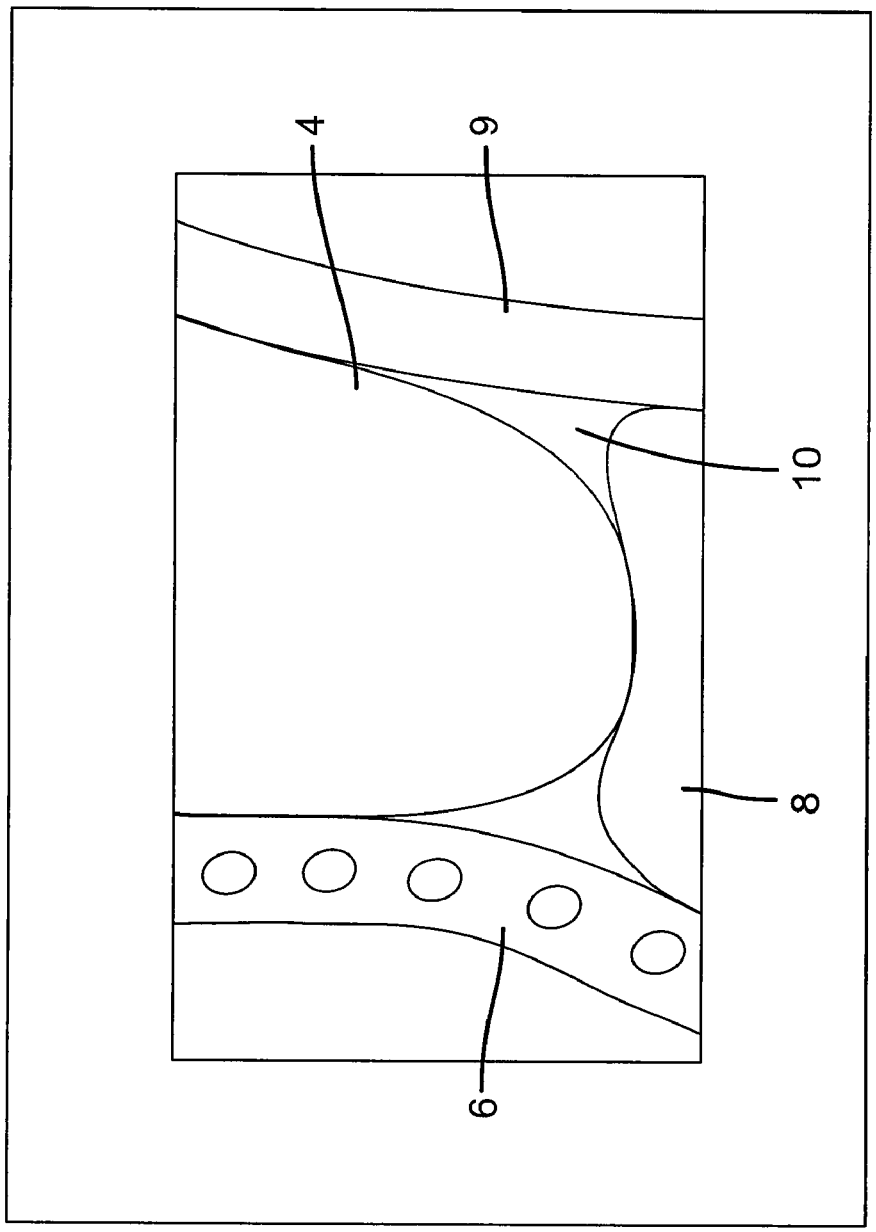
FIG. 1 shows a schematic representation of a slice of a 3D cardiac CT scan.

The following is a detailed description of the preferred embodiments of the invention, reference being made to the drawings in which the same reference numerals identify the same elements of structure in each of the several figures.

In order to understand the invention and to see how it may be carried out in practice, a preferred embodiment will now be described, by way of non-limiting example only, with reference to the accompanying figures.

A method of the invention was used to detect the boundary between heart muscle tissue and liver tissue and between heart muscle tissue and the sternum in a 3D cardiac CT scan. FIG. 1 shows a schematic representation 2 of a saggital section of the 3D cardiac CT scan that was analyzed by the method of the invention. The scan included, in addition to cardiac tissue 4, sternum and ribs 6, liver 8, aorta 9 and epicardial fat 10. Lung tissue was also present in the 3D scan, although it is not present in the section of FIG. 1. The image was segmented so as to remove from the scan liver tissue and sternum, as well as lung tissue. The resulting segmented image containing only the heart was displayed on a display screen. The entire process comprises 10 stages, as described below.

1. Determining Heart Center in Axial Slices

Figure 2:
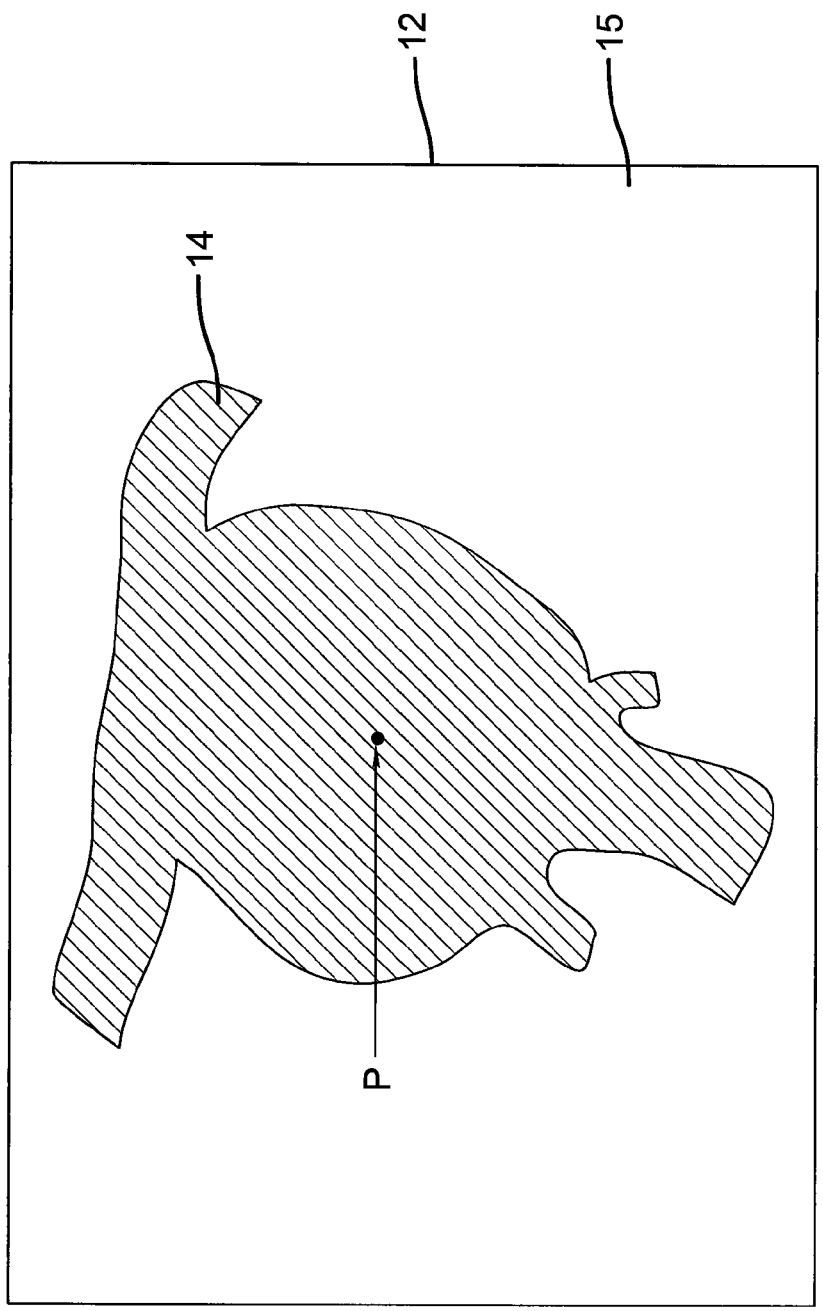
FIG. 2 shows a heart mask that was used to locate the heart in the 3D cardiac CT scan.

The first step in the process was to locate approximately the heart in the scan. A mask was used that describes the form of a typical axial section of heart. This mask consisted of a two-dimensional array of 0's and 1's, and was generated from a central axial section of a typical heart scan, by setting 1 whenever the gray level was greater than −500 Hounsfields the lung maximum value) and 0's otherwise. A special point was selected, located in the approximate center of the heart in the mask. FIG. 2 shows the form of the heart mask 12 that was used. The hatched region 14 represents the heart and sternum tissue and consists of voxels having a grey value greater than the lung maximal grey value of −500 Hounsfields, and 1 in the binary image. The unhatched region 15 represents lung voxels and consists of voxels having a value of 0 in the binary image. A special point P was selected located in the approximate center of the heart in the mask.

The mask was used to locate the heart cross-section in each of a plurality of axial slices in the scan as follows:

For each of a plurality of given points in a slice, a grade was calculated indicative of the probability that the given point is located at the slice's center, as follows.

a) The mask was enlarged or reduced so that its mm-per-pixel equaled that of the slice.

b) A two dimensional array of 0's and 1's was generated for the slice in which voxels in the slice having a gray level below 500 Hounsfields were assigned a value 0, and voxels having a gray level above −500 Hounsfields were assigned a gray level at 1.

c) The mask was superimposed over the bit plane generated in step b, such that the point P coincided with the selected point of the slice.

d) The number of coinciding 1's of the mask and the bit plane (within the boundaries of both) were counted.

e) The ratio of the number of coinciding 1's to the total number of 1's in the mask is an estimate of the extent to which the non-lung tissues in the slice resemble those of the mask. This ratio is referred to herein as the "plus-match", and it has a value between 0 and 1.

f) The number of coinciding 0's of the mask and the bit plane were counted. The ratio of the number of coinciding 0's to the total number of 0's of the mask is an estimate of the extent to which the lung-like tissues of the slice resemble those of the mask. This is referred to herein as the "minus-match", and it also has values between 0 and 1.

g) The sum of the plus-match and the minus-match was the "match". It has a value between 0 and 2, and is an estimate of the match of the slice to a typical heart section form, with the given point as the heart section center.

h) A point having the maximal match is designated as the heart center in the slice.

2. Finding an Axial Position of the Liver and the Heart

An estimate was found for the liver level and for a central slice of the heart. The number of lung voxels in each slice (i.e. voxels with grey values between −900 and −500 Hounsfields) was calculated. The slice with the maximum number of lung voxels was found and then the first slice below the maximal one with less than half of the maximal lungs voxels was found. This last slice is typically in the vicinity of the upper liver level in the scan. A first estimate for the central slice of the heart was taken at the slice 40 mms above the upper liver level.

3. Determining the Heart Location in the 3D Scan a) The examination began in the central slice of the scan found in step (2), and then moving up and down a fixed number of slices to the next slice to be examined. The number of slices in each jump was derived from the physical scale of the scan, and was typically the number of slices in 1 cm of the scan, (i.e. equal to 10/z-mm-per-pixel). For example, if the study had 100 slices, and the z-mm-per-pixel equaled 0.5, slice number 50 was first examined followed by slice number 70, 30, 90 and 10.

b) Each examined slice was divided into N×N squares, for some fixed value of N (e.g. N=5 or N=7 voxels) and a lattice of points was selected with each lattice point belonging to a different one of the squares. The examination started with an initial lattice point and then continued with the lattice points in order of their distance located from the initial point.

c) For each lattice point in each examined axial slice, the above defined "match" was calculated. The lattice point at which the maximum match occurred was taken as an approximate location of the heart center in the slice.

d) The lattice point having the maximum match from among all lattice points examined from all slices examined was taken as the heart center in the scan.

e) If, in the course of matching, a lattice point was encountered having a match greater than 1.5, this was considered to be a satisfactory estimate for the heart center in the scan, and the search was terminated.

4. Determining the Heart Orientation in the 3D Scan

In most cases the subject is supine during scanning, and the sternum line in the axial images is essentially horizontal. In some cases, however, the subject is required to lie on his side, or due to an unusual anatomy, the sternum line is not horizontal. Thus, it was necessary to determine the orientation of the heart in the scan. For this, an initial heart contour was detected in a plurality of axial slices in which the heart center was previously located, as follows:

An array of 200 uniformly distributed rays was generated in the slice emanating from the heart center of the slice, as determined in step (1), towards the boundary of the slice. The intersection of each ray with the lung tissue was determined. The first ray is directed in the positive x direction for simplicity. For each ray, the voxels nearest to the ray were examined and the first voxel that had a gray value lower than −500 (the lung maximum value) was stored in an array, one voxel per direction. The contour formed by these voxels typically encloses the heart, a part of the sternum in the front, the aorta and some pulmonary blood vessels in the rear side.

The contour of the heart in the mask (FIG. 2) and in the central axial slice were found. The principal axes of both the contour of the heart in the mask and the approximate contours in the central axial slice were taken as the line of least square distances of the points on the contour from among all lines passing through the heart center as previously determined. The minor axis was a line that was perpendicular to the major axis. (Equivalently, the principal axis of each contour is the eigenvector associated with the higher eigenvalue of the 2×2 inertia matrix of the contour.) The angle between the major axis of the mask and that of the central slice was taken to be the study-orientation. This angle is typically between 0° and 45°.

5. Determining the Heart Centerline

A point in the vicinity of the heart center was found in each axial slice of the heart. The process begins with the approximate heart center found previously in the central slice and, using a "steepest descent" algorithm, a point of maximal match with the mask, calculated as described above, was found in the vicinity of the approximate heart center. This point was taken as the center of the heart in the central slice.

The heart center in the central slice was used as the starting point for finding the heart center in the other axial slices. After the heart center was found in an axial slice, the heat center was located in an adjacent axial slice using a steepest descent algorithm starting from the heart center found in the previous slice.

In order to improve performance, the heart center may be calculated as described above only in some of the slices, for example, in those slices that are a fixed distance from each other (for example, 5 mm apart, and in the case of 0.5 mm-per-pixel this means every 10 slices), and then interpolating between these points by linear interpolation.

The curve formed by the heart centers of all the axial slices in the scan is referred to as the "heart centerline".

Each slice is provided with a rotated frame of reference, with origin at the slice's heart center, and the x-direction rotated from the regular direction by the angle of the study orientation. The "lower" part is that part of the axial slice having in the rotated frame of reference positive y coordinates, and the "upper" part is that part of the axial slice with negative y coordinates.

6. Generating a Refined Axial Heart Contour

Given an axial slice, a refined heart contour was generated delineating the heart (and no other tissues) in the slice. The initial approximate heart contour in the slice generated as described above was used.

In order to obtain the refined contour that encloses only the heart, the points of the start and the end of the sternum along the initial approximate contour were found, and the points of the start and the end of the backside organs along the contour were also found.

In the initial approximate contour, starting with the study-orientation of the slice and proceeding around the array of rays defined above in step (4), the points on the upper half of the basic contour at which the length of the rays has a maximal increase and a maximal decrease between two adjacent rays in the array, were found. These points were taken as the end points of the sternum in the initial approximation contour.

For the backside organs, a slightly more complex criterion was employed in order to exclude discontinuities in the length of the rays due to pulmonary blood vessels, and not to the aorta. For each point on the lower half of the initial approximate contour, two grades were determined as follows:

If the length of a ray to the initial approximate contour point divided by the length of the previous ray in the array was greater than 1.2 the first grade was 1. If this ratio was less than 0.75 the first grade was −1. Otherwise, the first grade was 0.

Second, for each point on the initial approximate contour, the curvature of the basic contour was calculated. The angle between the tangents 3 voxels away on either side of the point was determined. If the angle was greater than 45° and the basic contour is locally concave at the point, then the curvature grade was defined to be 1. If this angle was greater than 45°, and the basic contour is locally convex at the point, then the curvature grade was −1. Otherwise the curvature grade was 0. The two grades for each point were added to get a jump-grade having one of the values −2, −1, 0, 1, 2.

The start and end of the backside organs was located in a 60° sector of the basic initial approximate contour, centered at the positive y-direction. The sector was searched clockwise and the first contour point with a jump-grade value of 2 was found. This point was taken as the start of the backside organs. From this point on, the first point with a jump-grade value of 2 was found. This point was taken as the end of the back side organs.

Having found the start and end points of the sternum and backside organs on the initial approximate contour, each pair of start and end points, the points were joined by a curve forming a continuous refined contour in such a way that the refined contour encloses heart tissue and minimal amounts of other organs. A technique described below (with reference to a contour of minimum length and curvature) was used to create a refined contour between each of the two pairs of start and end points that was continuous and smooth at the end points, and that has minimum length and minimum total curvature, to the extent possible. Since the generated contour cannot simultaneously have both minima, minimization of curvature was given priority over minimization of the length, by the value of the parameter r (refer to the technique described below with reference to the contour of minimum length and curvature). The value of r was taken to be 8.

The refined contour that was produced typically included parts of the sternum. Any parts of the sternum included in the refined contour were removed by the method of the invention as described below.

The maximal and minimal y-values of the points on the refined contour of the central slice were taken to be the heart-front-edge, and the heart-back-edge, respectively.

7. Detecting Epicardial Fat

A layer of epicardial fat surrounds the heart. The coronary arteries lie inside this fat, and it is important to distinguish epicardial fat from other tissues. In order to obtain the gray value range of the epicardial fat, in the central axial slice, the mean value and standard deviation of the gray levels of all voxels in the interior of the refined contour and at most 3 voxels away from the refined contour, were calculated. The epicardial fat's minimum gray value was taken to be the mean value minus 1.5 standard deviations, and the maximum value to be the mean value plus 1.5 standard deviations. This mean value is typically around −50 Hounsfields, and the standard deviation is typically around 50 Hounsfields.

8. Separation of the Liver

A boundary between the liver and heart was found in coronal heart sections by the method of the invention using a fast marching algorithm. Coronal sections having y-values between the heart-back-edge and the heart-front-edge were analyzed. The boundaries in the coronal sections were found iteratively. The central coronal section, having a y-value equal to the average of the heart-front-edge and the heart-back-edge y-value was analyzed first and the information obtained was used to analyze the adjacent coronal sections.

In the central coronal section, the approximate end points of the boundary were found. The boundary and its end points were sought in a detection region consisting of a horizontal band in the section (parallel to the x-axis) centered at the liver upper level found above, and having a total width of 6 cm. Inside this band, potential end points for the boundary were collected with a 10-voxel separation from each other in the z direction. The boundary of the lungs was found at each z level (on both x-extremities of the section), and these voxels were taken as possible end points of the boundary. If lung values were not found at a particular z level, the end points of the section at each z level were included among the collection of possible end points.

Given a voxel in the detection region, its z-direction neighbors, below and above, were found (n neighbors in each direction, where n=5 was used). The tissue type classification (lungs, fat, heart-or-liver, and contrast-material) of the given voxel and each of its ten neighbors was determined based upon their gray levels, as previously explained. The number of neighbors that were "missing" was also counted which occurred whenever the given voxel was close to the boundary of the section. A "good-grade" and a "bad-grade" for the voxel were generated as follows. The good-grade that was used is indicative of the extent that the given voxel's arrangement of neighbors has attributes expected of a voxel at the boundary between cardiac and liver tissue. The good-grade was taken to be the maximum of the following quantities (all between 0 and 1). (The set of neighbors from below included the voxel of interest itself):

The number of lung voxels divided by n.

The number of fat voxels from above times the total number of heart or liver voxels and contrast voxels from below, divided by n (n+1).

The bad-grade that was used is indicative of the extent that the given voxel's arrangement of neighbors has attributes different from attributes expected of a voxel at the boundary between heart and liver tissue and is taken to be the maximum of the following quantities (all between 0 and 1, again the neighbors from below include the voxel of interest itself):

The total number of fat, heart or liver, and contrast voxels from above, times the number of fat voxels from below, divided by n(n+1).

The number of contrast voxels from above times the number of contrast voxels from below, divided by n (n+1).

The number of heart or liver voxels from above times the total number of heart or liver voxels, and missing voxels, from below, divided by n(n+1).

A quantity indicative as to whether or not there are contrast voxels from below (1 or 0 respectively) having a gray value above 200.

In order to assign a cost to a voxel in the detection region, the bad-grade minus the good-grade was calculated and a constant offset greater than 1 was added to ensure that the assigned cost was positive. Suppose that this offset equals 1+e (e>0). The size of e defines the ratio between the grade of a completely good voxel (=e) to the grade of a completely bad voxel (=2+e), and hence the ratio of costs in the fast marching algorithm. e was taken to be 0.2.

Using these costs, a boundary connecting an initial point to an end point obtained above was first obtained in the central coronal section using a fast marching algorithm. If the endpoints were not on the boundary of the section, the boundary was extended to higher x-values with the z value of the end point, and to lower x-values with the z value of the initial boundary point. The obtained path was the approximate boundary between the heart and the liver in the central coronal section.

Coronal sections having other y-values were then examined. In order to find a heart-liver boundary in each section, the following inductive procedure was used. The end points of the boundary of the previously analyzed section (i.e. the points having the same x and z coordinates) were taken and the detection region used in the fast marching algorithm of the new coronal section consisted of points that were within a fixed distance (10 voxels were used in this example) from the boundary found in the previously analyzed section. This was done to ensure continuity of the 3D boundary between the liver and heart tissues layer, and to make the path searching more efficient. The same scoring was used for all of the coronal sections analyzed.

In order to complete the construction of the layer, the path of the start-y-value section was copied to lower y-value sections and the path from the end-y-value section was coped to higher y-value sections.

In this stage, after finding the liver-heart boundary, the "liver upper level" value, (and consequently the central slice, located 40 mm above the liver upper level, as described above, were updated. The liver upper level was taken to be the average of the z-values of boundary voxels, in an xy-square of edge of 40 mm, centered at the heart center (i.e. if the heart center in the central slice was found to be $(x_0, y_0)$ the z-values of the boundary at the points of the square $[x_0-h, x_0+h] X [y_0-h, y_0+h]$, were averaged, where $h=20/x\_mm\_per\_pixel$).

Finally, all the voxels that were below the boundary obtained were given the attribute 1, i.e. these are cage voxels that have to be removed from the scan.

9. Separation of the Sternum, Lungs and Aorta

A boundary was found separating the heart from the lungs, sternum and aorta. For this purpose axial slices were analyzed. The start and end z-levels between which the axial slices were analyzed were fixed. The lower z-bound was 1 cm above the updated liver level, and the upper z-bound was 13 cm above the updated liver upper level.

A boundary between the sternum and heart was found in the central axial slice by the method of the invention using a fast marching technique. The slices were treated iteratively starting with the central slice.

The end points of the boundary were the points of discontinuity of the initial approximate heart contour at the sternum that were found in step 5. The detection region was limited to a rectangle having an x-dimension extending from the sternum-start point to the sternum-end point, and the y-dimension was set to include both the sternum start and the sternum end point, and was extended 10 mms to lower y values.

A cost was assigned to each voxel in the detection region as follows:

For a given voxel in the detection region, a set of neighbors of the given voxel was formed consisting of n voxels (n=2 was used) on each side of the voxel of interest, along a line connecting the heart-center of the slice to the given voxel together with the given voxel (a total of 2n+1 voxels). The number of neighbors of each type (lungs, fat, heart, muscle and contrast-bone), along a ray from the heart center to the given voxel towards and away from the heart center, was determined. (The range of gray levels for the bone is the same range for the contrast material, hence the two types are considered together). The "inside" neighbors included the voxel of interest itself. Good and bad grades were assigned to the voxels in the detection region as follows:

The good-grade was the maximum of the following quantities:

the number of inside fat-value neighbors times the sum of the number of outside heart-muscle-value and the number of contrast-bone value voxels, divided by n(n+1).

The sum of inside fat voxels and heart-muscle voxels times the number of outside lung voxels, divided by n(n+1).

The bad-grade was the maximum of the following quantities:

1 if the given voxel is a contrast-bone voxel and 0 otherwise.

The number of inside fat voxels times the number of outside fat voxels divided by n*(n+1).

The number of outside contrast voxels divided by n.

The number of outside heart-muscle voxels divided by n.

The cost was the bad-grade minus the good-grade, plus a fixed offset to ensure that the cost is positive. An offset of 1.1 was used.

The fast marching algorithm produced a path between the end points that was very close to the sternum, with the sternum outside the path. The portion of the refined heart contour residing at the sternum heart boundary was replaced with the path produced by the fast marching algorithm.

After the boundary between the heart tissue and sternum was detected, the process was repeated for other axial slices. The following inductive step was used to detect the boundary in axial sections between the axial start and the axial end z values.

Given an axial slice, it was treated as above, except that now we looked for the sternum jumps only in a fixed size neighborhood (usually the size was 5 voxels) of the sternum discontinuities of the previously analyzed axial slice. This ensures the z-direction continuity of the sternum standard and points.

The detection region used was limited to a two-dimensional neighborhood within a radius of voxels where distance from the previously found boundary is at most 10 voxels. This ensures continuity of the 3D sternum boundary layer, and provides efficient computability.

This produced an envelope of the heart, between the start and end z values. The start level contour was copied to all axial sections of lower z values, and the end level contour was copied to all axial sections of the higher z values.

All the voxels that were outside this envelope were assigned the attribute 1, i.e. these were cage voxels.

10. Smoothing the Surface

The final step was to smooth surface of the cage/heart. An opening operation was used first, followed by a closing operation as described in [2].

Figure 3:
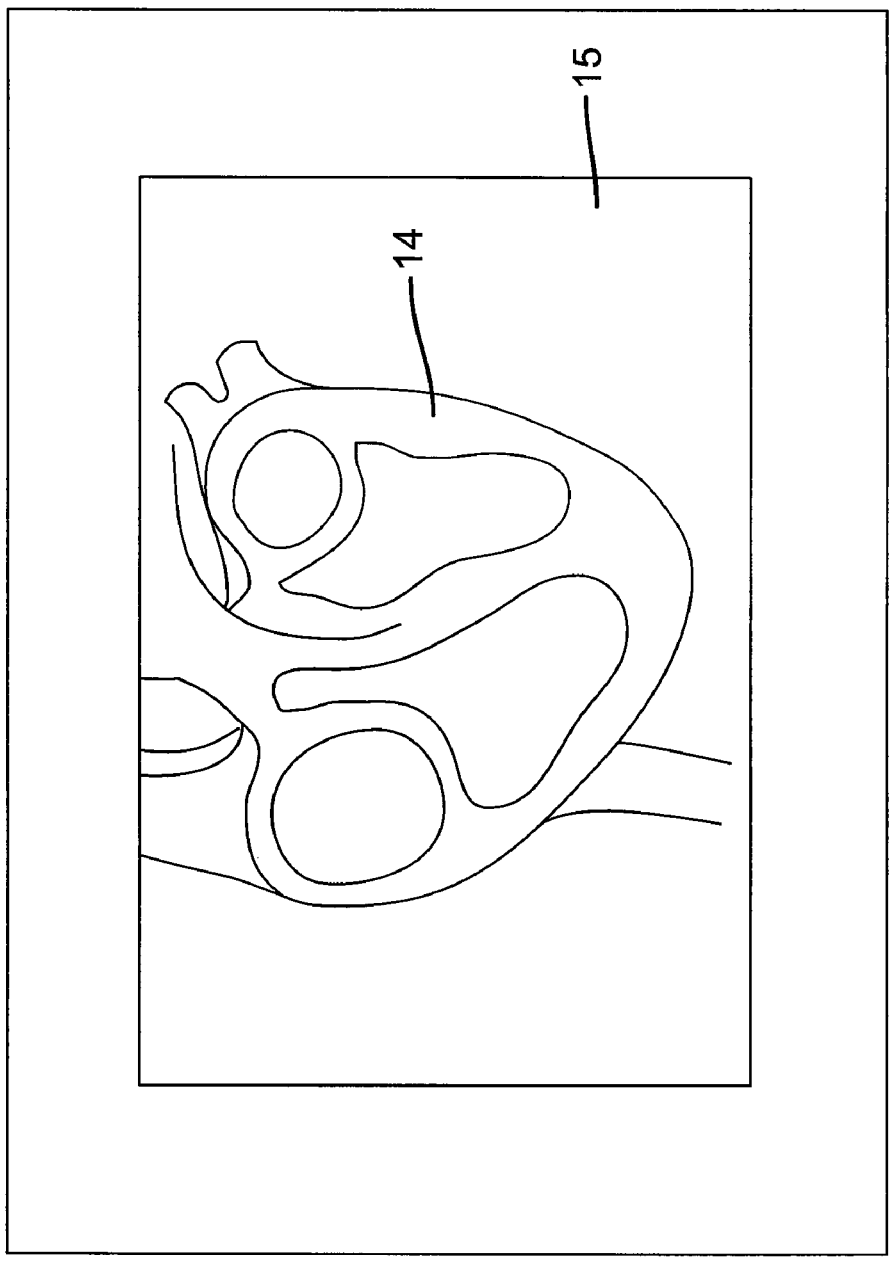
FIG. 3 shows a schematic representation of a slice of the 3D cardiac CT scan flowing segmentation of the original scan by the method of the invention.

The boundary between the heart tissue and the adjacent cage tissues in all slices defines a boundary in the 3D scan between the heart and the cage tissues. The 3D scan was then segmented. FIG. 3 shows a schematic representation of a section of the segmented scan showing cardiac tissue 14. Bone, liver, lung, and aorta tissues are absent from the segmented 3D scan.

Contour of Minimum Length and Curvature

A description is now provided regarding a contour of minimum length and curvature. We are given two points in the plane, and the direction of the tangent at each point, and we need to connect these two points with a smooth contour, while controlling both its length and its curvature.

We treat the curve in a parametric representation:

$$R(t)=(X(t),Y(t)), 0 \leq t < 1$$

The problem is solved separately for each coordinate. For this purpose a mathematical method called Calculus of Variations is used. A description of the method can be found in any textbook on Analytic Mechanics.

Here we take the Lagrangian to be:

$$L(t,\dot{X},\ddot{X})=\dot{X}^2+r^2\cdot\ddot{X}^2$$

The parameter r can be interpreted as the ratio between the measure to which we require minimum curvature to the measure to which we require minimum length.

Applying the Euler-Lagrange Equations to this Lagrangian, we get the differential equation:

$$X^{(4)}+r^2\cdot\ddot{X}=0$$

The general solution of this equation is given by:

$$X(t)=A\cdot\exp(rt)+B\cdot\exp(-rt)+C\cdot t+D$$

where the coefficients A, B, C, D are determined by the four values

X(O), X(1), X(O), X(1).

It will be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

All documents, patents, journal articles and other materials cited in the present application are hereby incorporated by reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 2 saggital section of a 3D cardiac CT scan.
4 cardiac tissue
6 sternum and ribs
8 liver
9 aorta
10 epicardial fat
12 heart mask
14 heart and sternum tissue
15 lung tissue
P point in the approximate center of the heart in the mask

The invention claimed is:

1. A method of segmenting tissue of interest in a CT scan of the area of the tissue of interest, comprising:
processing a first section of the CT scan data using a computer to define a contour representing a 2D boundary between the tissue of interest and adjacent tissue;
processing a succession of further sections using the computer to define a contour representing a 2D boundary of the tissue of interest in the section being processed, each 2D boundary being within a selected distance from the 2D boundary in a previously processed section; and
generating a 3D boundary enclosing the tissue of interest in relation to the adjacent tissue from the succession of 2D boundaries defined in the succession of sections,
wherein the processing to define the 2D boundaries in the first section and the boundaries in the successive sections is performed by the computer using a cost function that defines the likelihood that a voxel in a section is not located on the boundary between the heart and the first adjacent tissue, the boundary in the section being processed being determined as a path between a pair of start and end points having the lowest cost,
wherein a cost assigned to a given voxel is calculated by the computer as a difference of a bad-grade and a good-grade, the good-grade being indicative of the extent that the given voxel's arrangement of neighbors has attributes of a voxel at the boundary between the tissue of interest and adjacent tissues and the bad-grade being indicative of the extent that the given voxel's arrangement of neighbors has attributes different from attributes of a voxel at the boundary between adjacent tissues, and
wherein the good-grade of given voxel is based upon any one or more of the following, for a predetermined n:
(a) the number of adjacent tissue voxels neighboring the given voxel within an n-voxels neighborhood, divided by n; and
(b) the number of fat voxels within an n-voxels neighborhood, from above times the total number of tissue of interest voxels or adjacent tissue voxels and contrast voxels within an n-voxels neighborhood, from below, divided by n (n+1).

2. The method according to claim 1, wherein a cost is assigned to a given voxel in a section by:
(a) classifying one or more voxels in a neighborhood of the given voxel into a tissue class from among one or more tissue classes; and
(b) assigning the cost to the given voxel in a computer calculation involving the tissue classification of voxels in the neighborhood.

3. The method according to claim 2 wherein the given voxel has a gray level and a voxel is classified into a tissue class by:
(a) providing a gray level range for each of the one or more tissue classes; and
(b) classifying the voxel into a tissue class whose gray level range includes the gray level of the voxel.

4. The method according to claim 1 wherein the CT scan is a cardiac CT scan.

5. The method according to claim 4 wherein the tissue of interest is cardiac tissue.

6. The method according to claim 5 wherein the adjacent tissue is one or more of lung tissue, fat tissue, or liver tissue, sternum tissue, and contrast-material.

7. The method according to claim 6 wherein a cost assigned to a given voxel is calculated by the computer based on a difference between a bad-grade and a good-grade, the good-grade being indicative of the extent that the given voxel's arrangement of neighbors has attributes of a voxel at the boundary between the tissue of interest and the adjacent tissue and the bad-grade being indicative of the extent that the given voxel's arrangement of neighbors has attributes different from attributes of a voxel at the boundary between the tissue of interest and the adjacent tissue.

8. The method according to claim 5 wherein the adjacent tissue is bone tissue.

9. The method according to claim 8 wherein the bone tissue is sternum.

10. The method according to claim 1, wherein the processing using a cost function is performed by a fast marching algorithm.

11. A non-transitory computer program storage device readable by a computer, tangibly embodying a computer program of instructions executable by the computer to perform the method of claim 10.

12. The method according to claim 1, wherein the processing of successive adjacent sections continues until a defined criterion is satisfied.

13. The method according to claim 1 wherein the sets of start and end points in the first section are defined arbitrarily, and the sets of start and end points in the successive sections are determined by:
generating a domain using the computer consisting of all points in a previously processed adjacent section that are a given distance from the boundary determined in that section;
selecting start and end points in a succeeding section that are at the given distance from the boundary of the previous section; and
using the cost function to determine the boundary in the succeeding section, with the determination being restricted to points in the generated domain.

14. The method according to claim 13, wherein determination of the boundaries using the cost function in the succession of sections is made using a fast marching algorithm.

15. A non-transitory computer program storage device readable by a computer, tangibly embodying a computer program of instructions executable by the computer to perform the method of claim 13.

16. A method of segmenting tissue of interest in a CT scan comprising:
repeating the processing as defined in claim 1 to develop a set of 2D boundaries between the tissue of interest and a second adjacent tissue; and
generating a composite 3D boundary enclosing the tissue of interest in relation to the first and second adjacent tissues from the succession of 2D boundaries between the tissue of interest and the adjacent tissue with the succession of 2D boundaries between the tissue of interest and the second adjacent tissue using the computer to form a composite 3D boundary.

17. The method according to claim 16 wherein the composite 3D boundary is incorporated into the CT scan.

18. A non-transitory computer program storage device readable by a computer, tangibly embodying a computer program of instructions executable by the computer to perform the method of claim 17.

19. A non-transitory computer program storage device readable by a computer, tangibly embodying a computer program of instructions executable by the computer to perform the method of claim 16.

20. The method according to claim 1 wherein the cost assigned to a path is a sum of the costs of the voxels of the path.

21. A non-transitory computer program storage device readable by a computer, tangibly embodying a computer program of instructions executable by the computer to perform the method of claim 20.

22. A non-transitory computer program storage device readable by a computer, tangibly embodying a computer program of instructions executable by the computer to perform the method of claim 1.

23. The method according to claim 1 wherein the succession of selected distances are between 2D boundaries in a previously processed adjacent section.

24. The method according to claim 1 wherein each of the succession of further sections are parallel to each other.

25. A method of segmenting tissue of interest in a CT scan of the area of the tissue of interest, comprising:
processing a first section of the CT scan data using a computer to define a contour representing a 2D boundary between the tissue of interest and adjacent tissue;
processing a succession of further sections using the computer to define a contour representing a 2D boundary of the tissue of interest in the section being processed, each 2D boundary being within a selected distance from the 2D boundary in a previously processed section; and
generating a 3D boundary enclosing the tissue of interest in relation to the adjacent tissue from the succession of 2D boundaries defined in the succession of sections;
wherein the processing to define the 2D boundaries in the first section and the boundaries in the successive sections is performed by the computer using a cost function that defines the likelihood that a voxel in a section is not located on the boundary between the heart and the first adjacent tissue, the boundary in the section being processed being determined as a path between a pair of start and end points having the lowest cost;
wherein a cost assigned to a given voxel is calculated by the computer as a difference of a bad-grade and a good-grade, the good-grade being indicative of the extent that the given voxel's arrangement of neighbors has attributes of a voxel at the boundary between the tissue of interest and adjacent tissues and the bad-grade being indicative of the extent that the given voxel's arrangement of neighbors has attributes different from attributes of a voxel at the boundary between adjacent tissues; and
wherein the bad-grade is based upon any one or more of the following, for a predetermined n:
(a) the total number of adjacent tissue voxels and contrast voxels within an n-voxels neighborhood, from above, times the number of voxels of a further adjacent tissue within an n-voxels neighborhood, from below, divided by $n(n+1)$;
(b) the number of contrast voxels within an n-voxels neighborhood, from above times the number of contrast voxels within an n-voxels neighborhood from below, divided by $n(n+1)$;
(c) the number of tissue of interest voxels or adjacent tissue voxels within an n-voxels neighborhood from above times the total number of heart or liver voxels, within an n-voxels neighborhood and missing voxels, from below, divided by $n(n+1)$; and
(d) a quantity having the value 1 if there are contrast values having a gray value above 200, and 0 otherwise;
wherein a cost is assigned to a given voxel in a section by:
(a) classifying one or more voxels in a neighborhood of the given voxel into a tissue class from among one or more tissue classes; and
(b) assigning the cost to the given voxel in a computer calculation involving the tissue classification of voxels in the neighborhood.

26. A non-transitory computer program storage device readable by a computer, tangibly embodying a computer program of instructions executable by the computer to perform the method of claim 25.

27. A method of segmenting tissue of interest in a CT scan of the area of the tissue of interest comprising:
processing a first section of the CT scan data using a computer to define a contour representing a 2D boundary between the tissue of interest and adjacent tissue;
processing a succession of further sections using the computer to define a contour representing a 2D boundary of the tissue of interest in the section being processed, each 2D boundary being within a selected distance from the 2D boundary in a previously processed section; and
generating a 3D boundary enclosing the tissue of interest in relation to the adjacent tissue from the succession of 2D boundaries defined in the succession of sections;
wherein the processing to define the 2D boundaries in the first section and the boundaries in the successive sections is performed by the computer using a cost function that defines the likelihood that a voxel in a section is not located on the boundary between the heart and the first adjacent tissue, the boundary in the section being processed being determined as a path between a pair of start and end points having the lowest cost;
wherein a cost is assigned to a given voxel in a section by:
(a) classifying one or more voxels in a neighborhood of the given voxel into a tissue class from among one or more tissue classes; and
(b) assigning the cost to the given voxel in a computer calculation involving the tissue classification of voxels in the neighborhood;
wherein a cost assigned to a given voxel is calculated as a difference of a bad-grade and a good-grade, the good-grade being indicative of the extent that the given voxel's arrangement of neighbors has attributes of a voxel at the boundary between cardiac and a selected adjacent tissue and the bad-grade being indicative of the extent that the given voxel's arrangement of neighbors has attributes different from attributes of a voxel at the boundary between cardiac and the selected adjacent tissue;

wherein the tissue of interest is cardiac tissue, and the one or more tissue classes are selected from lung tissue, fat tissue, heart tissue and contrast or bone tissue;

wherein a cost assigned to a given voxel is calculated as a difference of a bad-grade and a good-grade, the good-grade being indicative of the extent that the given voxel's arrangement of neighbors has attributes of a voxel at the boundary between cardiac and a selected adjacent tissue, and the bad-grade being indicative of the extent that the given voxel's arrangement of neighbors has attributes different from attributes of a voxel at the boundary between cardiac and the selected adjacent tissue; and wherein the good-grade is based upon any one or more of the following, for a predetermined n:

(a) the number of inside fat-value neighbors within an n-voxels neighborhood, times the sum of the number of outside heart-muscle-value and the number of contrast-bone value voxels within an n-voxels neighborhood, divided by $n(n+1)$; and (b) the sum of inside fat voxels and heart-muscle voxels within an n-voxels neighborhood, times the number of outside lung voxels within an n-voxels neighborhood, divided by $n(n+1)$.

* * * * *